March 6, 1962  F. DORÉ ET AL  3,024,005
ROTOR ADJUSTING ARRANGEMENT
Filed April 23, 1959

INVENTORS
Franklyn Doré
Charles A. Lyle

By Wayne Lang
AGENT

United States Patent Office 3,024,005
Patented Mar. 6, 1962

3,024,005
ROTOR ADJUSTING ARRANGEMENT
Franklyn Doré and Charles A. Lyle, Wellsville, N.Y., assignors to The Air Preheater Corporation, New York, N.Y., a corporation of New York
Filed Apr. 23, 1959, Ser. No. 808,457
2 Claims. (Cl. 257—269)

The present arrangement relates to rotary regenerative heat exchange apparatus or the like and particularly to improvements in the mounting and support of a rotor for such apparatus whereby it may be readily adjusted axially to provide the proper space relationship with a surrounding housing.

In heat exchange apparatus of the type herein disclosed, a rotor carries a mass of heat exchange material alternately between a heating fluid and a fluid to be heated. The rotor is surrounded by a housing having end plates formed with openings that direct the heating fluid and fluid to be heated to and through the rotor, and to preclude the flow of either fluid through the clearance space between the rotor and the rotor housing in a way that it would bypass the heat exchange material, it is customary to provide the rotor with circumferential and radial sealing means that bear against confronting surfaces of the end plates or other stationary parts of the housing.

Usually such sealing means as are required are made individually adjustable in order that the clearance space between the rotor and confronting surfaces of the housing may be maintained at an optimum for long periods of time and for a wide range of operating conditions. This invention however contemplates an arrangement that permits adjusting the clearance space to an optimum by means of an axial adjustment of the entire rotor within the rotor housing. The invention will be better understood upon consideration of the following detailed description of an illustrative embodiment thereof when read in connection with the accompanying drawings in which:

Figure 1:
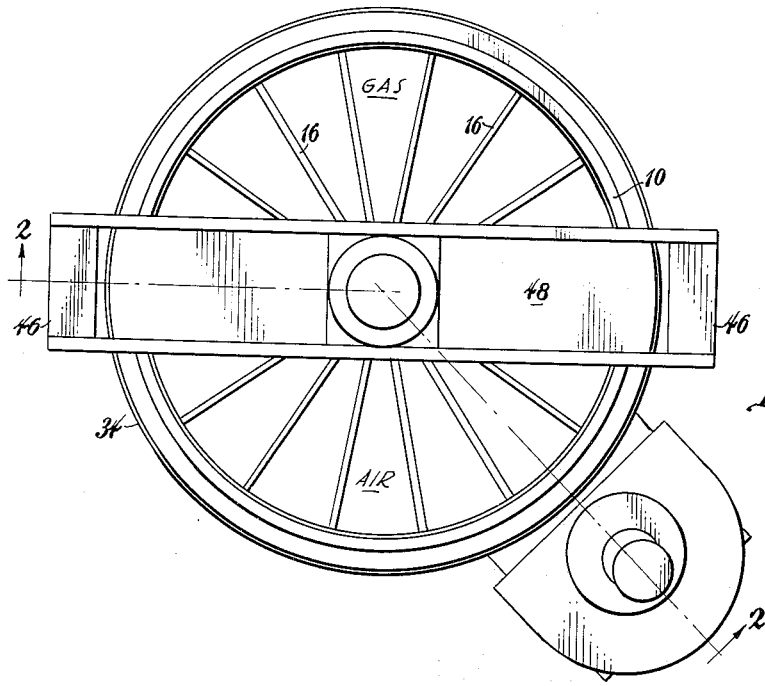
FIGURE 1 is a top plan view of a rotary regenerative heat exchanger arranged according to this invention.
Figure 2:
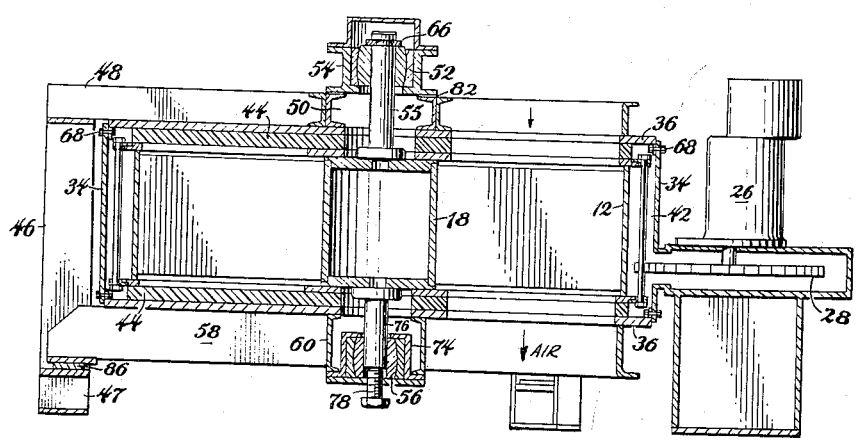
FIGURE 2 is an elevational view of the heat exchanger as seen on line 2—2 of FIGURE 1.

In the drawings the numeral 10 designates a rotor having a cylindrical shell 12 that is divided into sector shaped compartments by radial partitions 16 that extend outward from a pivotally supported rotor post 18. The rotor compartments contain regenerative heat exchange material that is adapted to first absorb heat from the heating fluid that enters the housing from a combustor or other source of heat and is discharged, after passing over the heat exchange mtaerial, through an outlet duct to which an induced draft fan is usually attached. As the rotor is turned slowly about its axis by a drive motor 26 and driving means 28, the heated heat exchange material is moved into a stream of air or other fluid to be heated that is admitted through a spaced passageway, and after passing over the hot heat exchange material and absorbing heat therefrom, the heated air or other fluid is conveyed to a predetermined place of use.

A housing 34 encloses the rotor and is provided at opposite ends thereof with end plates 36 that are apertured at diametrically opposite sides to direct the heating fluid and the fluid to be heated to and through the rotor, and in order that the spaced fluid streams may not by-pass the heat transfer surface by flowing axially in the annular clearance space 42 between the rotor shell 12 and the housing 34, it is customary to provide sealing means 44 that effect a barrier therebetween. The sealing means may be either fixed to the rotor in such a manner that it will bear against the confronting end plate, or as is herein illustrated, the sealing means 44 is fixed with respect to the confronting end plate so as to bear against the relatively moving rotor.

In this invention the rotor housing 34 and its end plates 36 are mounted separate from the rotor in such a manner that the rotor may be moved axially within the housing to provide the proper sealing relationship. The support structure that makes such a relationship possible comprises a pair of support pedestals 46 at diametrically opposite sides of the housing that are supported upright on suitable structure 47, and an upper support beam connecting plate 48 extending between the pedestals that is supported upon their upright ends. The support beam connecting plate is centrally ported to provide a peripheral support for a support bearing 52 in a bearing housing 54, the housing 54 mounted on the ported beam being adapted to receive a rotor trunnion 55 extending upward therethrough. The rotor trunnion 55 is in turn adapted to support the entire rotor for rotation about its axis. A guide bearing 56 mounted in a lower support beam connecting plate 58 is in turn supported at its ends by the same structure 47 that supports the pedestals 46. The guide bearing 56 is mounted in a housing 60 that is connected to the beam connecting plate 58 around a central opening while the beam connecting plate 58 is supported at its ends by the same structure 47 that supports the pedestals 46.

In assembling and aligning a rotary regenerative heat exchange apparatus that is constructed and arranged according to this invention, the support pedestals 46 are first mounted upright on structure 47 in the proper space relationship, and the upper support beam connecting plate 48 is secured between their upright ends. The support bearing assembly 52—54 is then mounted concentrically about the port 50 in the connecting plate 48 and the entire rotor assembly is then raised into position. As the upper trunnion 55 passes through the bearing 52 it is locked in place by a locking collar 66 in such a manner that the entire rotor assembly is supported thereby. The rotor housing 34 is then raised into position and secured to the upper support beam connecting plate by flange bolts 68 and the lower connecting plate assembly is also raised until it may be supported upon the structure 47.

A guide bearing 56 mounted in a housing 74 is raised into position around the lower trunnion 76 and secured to the lower support beam connecting plate to preclude lateral movement of the rotor during its rotation. The bearing housing 74 is adapted to receive a jackscrew 78 or the like in axial alignment with the lower trunnion 76 whereby actuation of the screw against the end of the trunnion will induce an axial shifting of the entire rotor. By adjusting the screw 78 the rotor may therefore be moved axially until a predetermined relationship is obtained between the end edge of the rotor and the sealing means 44. As the rotor is lifted by the screw 78 the upper trunnion 55 and its locking collar 66 is also lifted up from the bearing 52 thereby necessitating the insertion of shims 82 in the space beneath the housing 54 to again raise the bearing to a snug fit against the collar 66 in such a manner that it may again support the rotor. After providing the proper relationship at the upper end of the rotor, the lower connecting plate 58 is raised to provide a similar relationship between the lower seal 44 and the lower end of the rotor. Shims 86 of the proper thickness are then inserted beneath the ends of connecting plate 58 to maintain this relationship.

After all axial adjustments have been made to provide the proper sealing relationship, housing adjustment bolts 68 are fastened securely and the adjusting jackscrew 78 is backed away from contact with the end of the lower trunnion 76 to place the entire load of the rotor on the upper support bearing 52. As distortion of the rotor or the abrasion of materials produces variations in the sealing relationship, additional adjustments may readily be made by adjustment of the jackscrew 78 and providing the proper shims at 82 and 86.

While this invention has been described with reference to the embodiment illustrated in the drawing, it is evident that numerous changes may be made without departing from the spirit of the invention. It is therefore intended that all matter contained in the above description or shown in the accompanying drawings shall be interpreted as illustrative and not in a limiting sense.

What we claim is:

1. Rotary regenerative heat exchange apparatus or the like including a rotor having a cylindrical rotor shell joined to an axially supported rotor post by radial partitions to provide compartments that carry a mass of regenerative heat exchange material alternately between a heating fluid and a fluid to be heated; a housing surrounding said rotor having apertured end plates at opposite ends thereof adapted to simultaneously direct a heating fluid and a fluid to be heated through spaced portions of the rotor; sealing means intermediate the end edge of the rotor and the confronting face of the adjacent end plate adapted to preclude fluid flow therebetween; a bearing mounted at one end of the housing adapted to support the rotor for rotation about its central axis; a guide bearing mounted at the opposite end of the housing adapted to preclude radial displacement of the rotor post; and an axially adjustable beam connecting plate arranged to support the guide bearing concentric with said rotor throughout a wide range of axial displacement whereby said beam connecting plate may be moved axially to assume an optimum clearance space between said sealing means and the rotor.

2. A rotary regenerative exchange apparatus having a cylindrical rotor shell joined to an axially supported rotor post by radial partitions to provide compartments that carry a mass of regenerative heat exchange material alternately between a heating fluid and a fluid to be heated; a housing surrounding said rotor including apertured end plates at opposite ends thereof adapted to simultaneously direct a heating fluid and a fluid to be heated through spaced portions of the rotor; sealing means intermediate the end edges of the rotor and the confronting face of the adjacent end plates adapted to preclude fluid flow therebetween; bearing means at the upper end of said housing adapted to support the rotor for rotation about its axis; an upper support beam connecting plate extending over said housing to provide a fixed support for said bearing means independent from said housing; a guide bearing at the lower end of said housing laterally supporting the rotor post to preclude radial displacement of the rotor; a lower support beam connecting plate substantially parallel to said upper support structure carrying said guide bearing and mounted for axial movement along said rotor post; and jacking means carried by said guide bearing adapted to move the rotor post and support structure axially to maintain an optimum spacing arrangement between the rotor and adjacent end plates.

References Cited in the file of this patent

UNITED STATES PATENTS

| | | |
|---|---|---|
| 1,586,816 | Ljungstrom | June 1, 1926 |
| 2,422,795 | McKnight | June 24, 1947 |
| 2,471,995 | Yerrick et al. | May 31, 1949 |
| 2,732,183 | Hammond | Jan. 24, 1956 |
| 2,951,686 | Sandmann et al. | Sept. 6, 1960 |